(12) United States Patent
Vetter et al.

(10) Patent No.: US 10,874,493 B2
(45) Date of Patent: Dec. 29, 2020

(54) PERSONAL-HYGIENE SYSTEM

(71) Applicant: Braun GmbH, Kronberg (DE)

(72) Inventors: Ingo Vetter, Karben (DE); Leo Faranda, Rodgau (DE); Matthias Schiebahn, Bad Camberg (CH)

(73) Assignee: Braun GmbH, Kronberg (DE)

( * ) Notice: Subject to any disclaimer, the term of this patent is extended or adjusted under 35 U.S.C. 154(b) by 133 days.

(21) Appl. No.: 16/129,378

(22) Filed: Sep. 12, 2018

(65) Prior Publication Data

US 2019/0090999 A1 Mar. 28, 2019

(30) Foreign Application Priority Data

Sep. 22, 2017 (EP) ..................................... 17192762

(51) Int. Cl.
*A61C 17/22* (2006.01)
*A46B 15/00* (2006.01)

(52) U.S. Cl.
CPC ........ *A61C 17/221* (2013.01); *A46B 15/0002* (2013.01); *A46B 15/0006* (2013.01); *A46B 15/0008* (2013.01); *A46B 15/0012* (2013.01); *A46B 15/0044* (2013.01)

(58) Field of Classification Search
CPC ... A61C 17/221; A61C 17/222; A61C 17/349; A61C 17/3436; A61C 17/22; A61C 17/16; A61C 17/224; A61C 17/225; A61C 17/00; A46B 15/0002; A46B 15/0006; A46B 15/0008; A46B 15/0012; A46B 15/0044; A46B 2200/1066; A46B 15/00; A46B 15/0004; A46B 15/0038; A46B 15/0042; A46B 15/0046; A46B 13/00; A46B 13/02; A46B 13/023
See application file for complete search history.

(56) References Cited

U.S. PATENT DOCUMENTS

| | | | |
|---|---|---|---|
| 8,690,579 B2 * | 4/2014 | Ikkink | A46B 15/0002 15/105 |
| 8,744,192 B2 | 6/2014 | Ortins et al. | |
| 8,863,343 B2 | 10/2014 | Iwahori | |
| 10,349,733 B2 * | 7/2019 | Serval | A61C 17/221 |

(Continued)

FOREIGN PATENT DOCUMENTS

| DE | 102008027317 | 12/2009 |
|---|---|---|
| EP | 2092911 B1 | 12/2009 |

(Continued)

*Primary Examiner* — Robert J Scruggs
(74) *Attorney, Agent, or Firm* — Vladmir Vitenberg

(57) ABSTRACT

An oral-care system includes an oral-care device having a treatment head, a position-determination unit for determining position information of the treatment head in relation to a user's treatment area at a plurality of time instances during a treatment session, a sensor unit for determining treatment-parameter values of at least one treatment parameter at the plurality of time instances, a processor unit for processing the determined position information and the determined treatment parameter values to generate at least position-resolved treatment data, a memory unit for storing at least the position-resolved treatment data, and a control unit for triggering an action of the personal-hygiene system based at least on a current position information and on the stored position-resolved treatment data.

16 Claims, 3 Drawing Sheets

(56) References Cited

U.S. PATENT DOCUMENTS

| | | | |
|---|---|---|---|
| 2010/0281636 A1 | 11/2010 | Ortins et al. | |
| 2012/0171657 A1* | 7/2012 | Ortins | A46B 9/04 434/365 |
| 2012/0251975 A1* | 10/2012 | Iwahori | A61C 17/3481 433/119 |
| 2017/0069083 A1 | 3/2017 | Vetter et al. | |
| 2017/0303673 A1 | 10/2017 | Van Gool et al. | |

FOREIGN PATENT DOCUMENTS

| | | |
|---|---|---|
| EP | 3141151 | 3/2017 |
| WO | WO201646701 | 3/2016 |
| WO | WO2016047793 | 3/2016 |
| WO | WO2017157411 | 9/2017 |

* cited by examiner

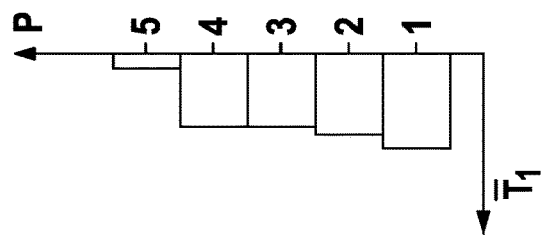
Fig. 3D
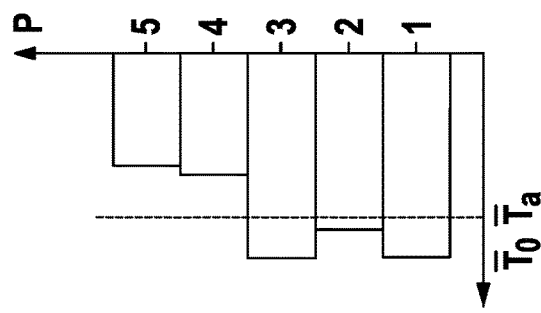
Fig. 3C
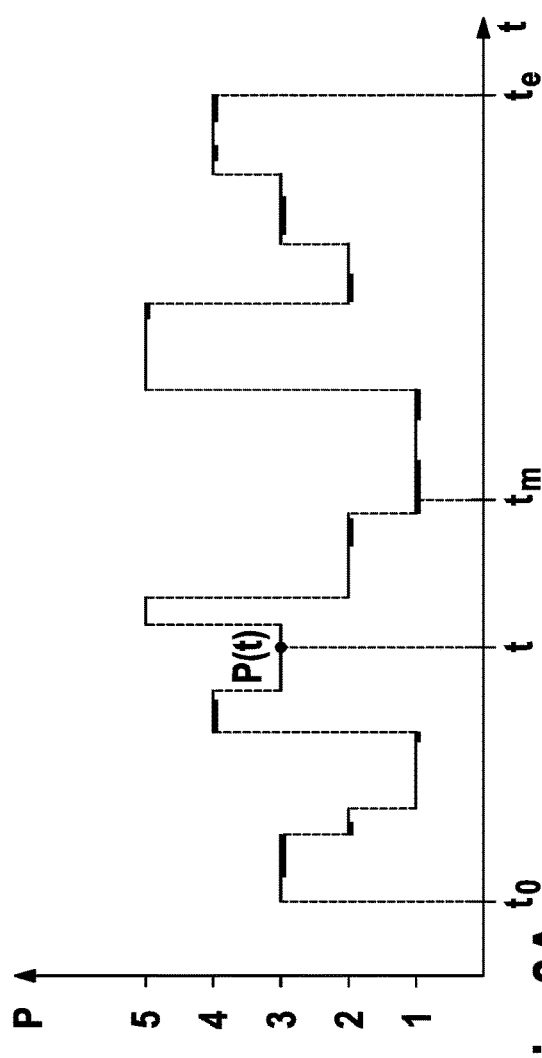
Fig. 3A
Fig. 3B
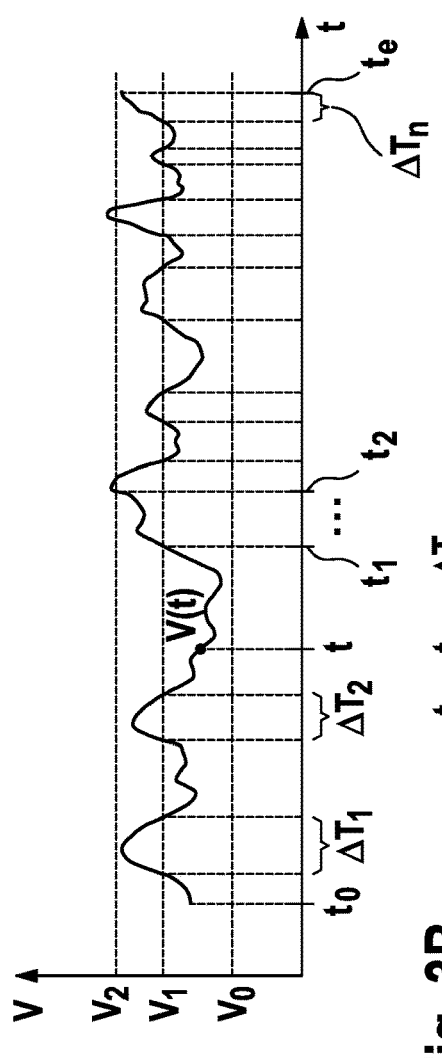

PERSONAL-HYGIENE SYSTEM

FIELD OF THE INVENTION

The present invention is concerned with a personal-hygiene system that comprises a position-determinatin unit for determining position information of a treatment head of a personal-hygiene device during a treatment session and a sensor unit for determining treatment parameter values.

BACKGROUND OF THE INVENTION

It is known that personal-hygiene systems such as oral-care systems can comprise a personal-hygiene device (e.g. an electric toothbrush) and a position-determinatin unit for determining current position information of a treatment head of the personal-hygiene device. It is also generally known that a personal-hygiene device can comprise a sensor unit for monitoring a treatment parameter such as the pressure with which a treatment head of the personal-hygiene device is pushed against a treatment area of the user. Document DE 10 2008 027 317 B4 generally discusses an oral hygiene system having such a combination of features.

It is an object of the present disclosure to provide a personal-hygiene system that is improved over the known personal-hygiene systems having a position information determination and a treatment parameter value determination, in particular where the improvement lies in the use of the position information and of the treatment parameter value information.

SUMMARY OF THE INVENTION

In accordance with one aspect there is provided a personal-hygiene system, in particular an oral care-system, having a personal-hygiene device, in particular an oral-care device, having a treatment head, a position-determinatin unit for determining position information of the treatment head in particular in relation to a user's treatment area at a plurality of time instances during a treatment session, a sensor unit for determining treatment parameter values of at least one treatment parameter at the plurality of time instances, a processor unit for processing the determined position information and the determined treatment parameter values to generate at least position-resolved treatment data, a memory unit for storing at least the position-resolved treatment data, and a control unit for triggering an action of the personal-hygiene system based at least on a current position information and on the stored position-resolved treatment data.

BRIEF DESCRIPTION OF THE DRAWINGS

The present disclosure is further elucidated by a detailed description of example embodiments and with reference to figures. In the figures

FIG. 3A is a depiction of example position information acquired during a treatment session;

FIG. 3B is a depiction of example treatment parameter values acquired during the same treatment session;

FIG. 3C is a depiction of the accumulated position-resolved treatment time the treatment head of the personal-hygiene device was positioned in the various position zones during the complete treatment session; and FIG. 3D is a depiction of the accumulated position-resolved treatment time during which the determined treatment parameter value shown in FIG. 3B was above a first threshold value during the complete treatment session.

DETAILED DESCRIPTION OF THE INVENTION

Figure 1:
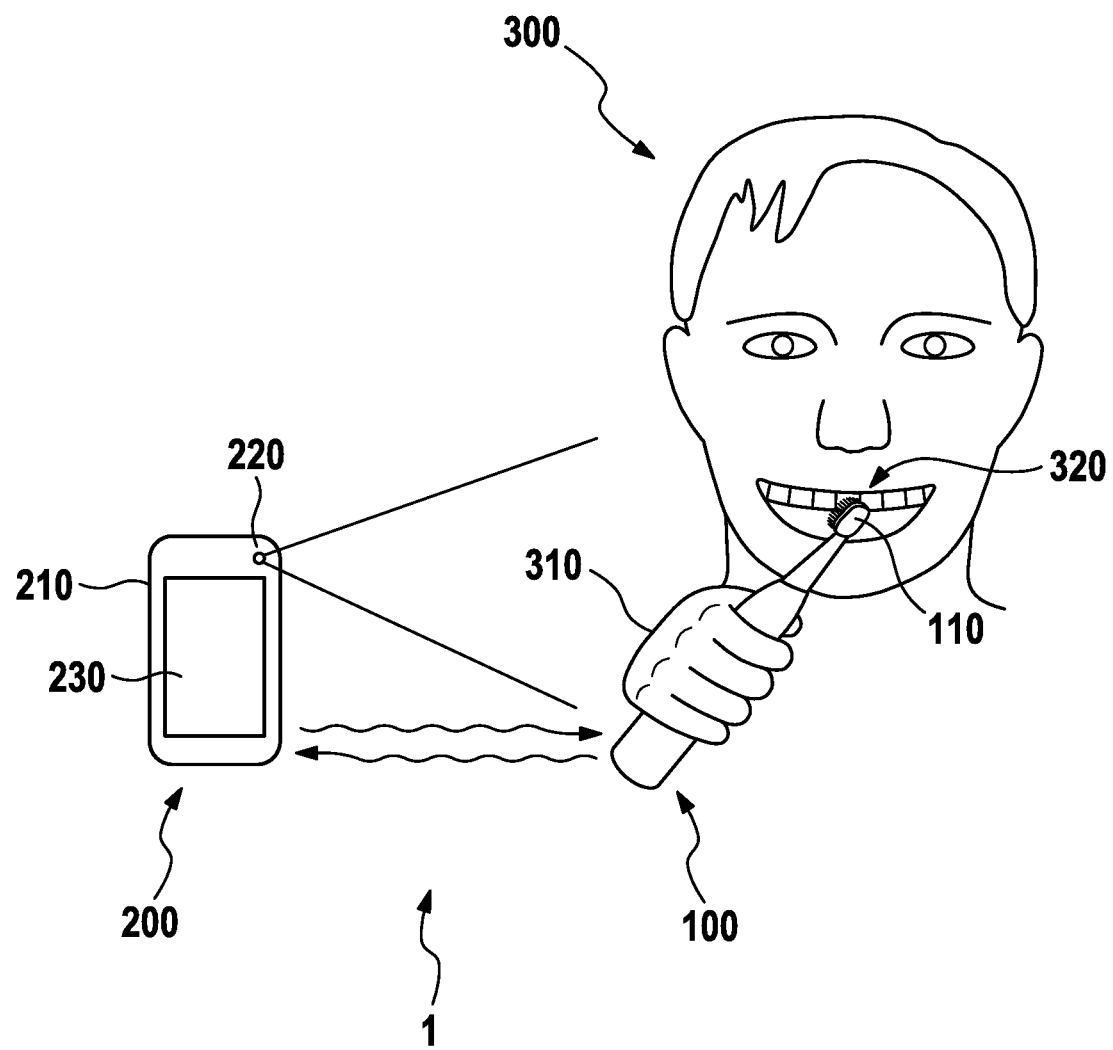
FIG. 1 is a depiction of an example personal-hygiene system in accordance with the present disclosure.

In the context of the present description "personal hygiene" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("hygiene") and on the other hand the cosmetic treatment and improvement of the appearance of the skin and its adnexa. It shall include the maintenance and strengthening of wellbeing. This includes skin care, hair care, and oral care as well as nail care. This further includes other grooming activities such as beard care, shaving, and depilation. A "personal-hygiene device" thus means any device for performing such nurturing or grooming activity, e.g. (cosmetic) skin treatment devices such as skin massage devices or skin brushes; wet razors; electric shavers or trimmers; electric epilators; and oral-care devices such as manual or electric toothbrushes, (electric) flossers, (electric) irrigators, (electric) tongue cleaners, or (electric) gum massagers. This shall not exclude that the proposed personal-hygiene system may have a more pronounced benefit in one or several of these nurturing or device areas than in one or several other of these areas.

A personal-hygiene system as proposed comprises a personal-hygiene device having a treatment head. The treatment head may be actively driven (by means of a drive unit)—it is then referred to as an electric personal-hygiene device instead of a manual personal-hygiene device, where in the latter case the treatment head is not actively driven (it may manually be moved by the user like a manual toothbrush or a wet razor). An electric toothbrush is one example of an electric personal-hygiene device, in particular an example of the group of electric oral-care devices. A manual toothbrush is an example of a manual personal-hygiene device, in particular an example of the group of manual oral-care devices.

The personal-hygiene system in accordance with the present disclosure comprises a position-determinatin unit that during operation (i.e. during a treatment session) determines at a plurality of time instances position information of the treatment head. The head is usually used at a user's treatment area and the position information of the treatment head may thus in particular be determined in relation to the user's treatment area. The position information may be an absolute position in space relative to a fixed coordinate system or a relative position determined in relation to a non-fixed reference system (e.g. the treatment area represents a non-fixed reference system as the user may move in space, where the space is here meant a fixed reference system, e.g. the bathroom). The position information may be the outcome of a statistical analysis or the like and may thus not be an absolute or relative position in space. In such a case, the position information may be a position zone such as, e.g., upper left molars or lower right cheek. Document EP 3 141 151 A1 describes a position determination method that uses a remote camera (e.g. the camera of a smartphone) and an accelerometer disposed in the personal-hygiene device to determine a position zone in relation to a user's treatment area rather than an absolute or relative position in space. The position detection unit may comprise at least one of a video camera, a magnetic sensor, a capacitive sensor, an IR sensor, a temperature sensor, an acceleration sensor, a gyroscope, an inclination sensor, an ultrasound emitter and an ultrasound receiver, or any combination thereof.

The user's treatment area is the area of a user that shall be nourished, cared for, or groomed. E.g. the user's treatment area of a personal-hygiene device realized as a toothbrush usually is the user's oral cavity comprising the user's teeth (and to some extent the gums and/or the tongue); the treatment area of a personal-hygiene device realized as a wet razor includes the hairy areas of the user (e.g. areas of facial hair). The time instances at which the position-determinatin unit determines the position information may be instances that all have a constant temporal distance (e.g. the position information and the treatment parameter value may be determined every millisecond (ms), every 10 ms, every 100 ms, every second, every 2 seconds, every 5 seconds, every 10 seconds etc.) Various technologies may be employed to determine the position information of the treatment head. These technologies may include motion tracking technology as known from cinematic special effects. European patent application EP 3 141 151 A1 mentioned before describes a technology that utilizes video stream analysis of a live video of the user while using the personal-hygiene device in combination with acceleration sensor data provided from an acceleration sensor disposed in the personal-hygiene device. U.S. Pat. No. 8,744,192 B2 describes a position detection technology using a camera and landmarks on a personal-hygiene device and on the user's anatomy (e.g. face). While some technologies may provide as position information absolute positions in space of treatment area and treatment head, from which the position of the treatment head with respect to the treatment area can be computed, other technologies may apply machine learning concepts and provide as position information directly a position of the treatment head in relation to the treatment area based on trained algorithms (e.g. the previously mentioned EP 3 141 151 A1 describes such a technology). While there is essentially an infinite number of absolute positions, the position information may be divided into a (in particular predetermined) finite number of position zones covering the treatment area, so that determination of position information may include that the position is directly determined on the level of the position zones. Document EP 3 141 151 A1 mentioned before describes that a position-determinatin unit outputs as position information a position zone having the highest probability of presence of the treatment head of the personal-hygiene device based analysis of a live video in combination with accelerometer data of the personal-hygiene device. The relevant content of EP 3 141 151 A1 is included herein by reference.

The personal-hygiene system also comprises a sensor unit that during operation determines a current value of at least one treatment parameter at the same or different time instances at which the position information is determined. In the following, most examples will be based on a contact pressure with which the treatment head is applied against the treatment area, but these examples shall be considered as non-limiting and the treatment parameter may be any other interesting parameter of the treatment session such as the motor current or motor voltage (if the personal-hygiene device comprises a motor, e.g. for driving the treatment head) measured by a motor current and/or motor voltage sensor, an output from a pH sensor, an output from a halitosis sensor, an output from an orientation or inclination sensor indicative of an orientation or inclination of the personal-hygiene device, an output from a torque sensor, an output from a movement sensor, an output from a chemical sensor measuring a chemical quantity at the contact area between the treatment head and the treatment area etc. The sensor unit is also to be understood to include a clock (a "time sensor") that "senses" the time. The treatment parameter is then the time and the treatment parameter values are then clock values. In some embodiments, the sensor unit includes a clock and a further sensor (e.g. a pressure sensor). In embodiments, where the determination of position information and treatment parameter values other than time occurs at temporally equidistant time instance, an additional clock value may not be needed. The sensor unit may comprise two or more sensors of the types mentioned above, even though other sensors are considered as well, e.g. a skin wetness sensor, a skin color sensor, a hair color sensor etc.

The personal-hygiene device in addition comprises a processor unit for processing at least a current value of the treatment parameter and a current position information in order to generate position-resolved treatment data. While the treatment parameter value and the position information are provided in a time-sequential manner (determined at a plurality of time instances during a treatment session), the treatment data itself is position resolved and may not be time sequential (this shall not exclude that the personal-hygiene system stores—alternatively or in addition—a temporal sequence of the treatment data values and of the position information). Generally, the position resolved treatment data may be constituted by pairs of position information converted into position zone information and treatment parameter values. A position zone here means a position area that may be defined in a quantitative or qualitative manner (see examples provided below). The processor unit may in addition or alternatively accumulate the treatment parameter values for each position zone. Accumulation may mean just adding or may mean weighting in a time-weighted manner. The position resolved treatment data may also comprise triplets of data points, e.g. position information, treatment parameter value (other than time), and clock value (or effective temporal width, i.e. the time period between the subsequent time instances). Instead of a single treatment parameter value, several (i.e. two or more) different treatment parameter values may be determined and stored at each time instant. Further data may be added such as information allowing to identify the user, date and/or time information (e.g. am timing or pm timing), information about the used treatment head (if different treatment heads can be used) etc.

The processor unit may be pre-programmed or calibrated so that the treatment area (which may be different for individual users) is divided into a predefined number of treatment zones (e.g. in oral care the treatment zones may be individual tooth surfaces, individual teeth, or dental zones comprising a plurality of teeth, while for shaving the treatment zones may be sub-areas of the hairy parts of the face such as left cheek, right cheek, chin, upper lip, and neck). In a calibration mode, the user may use the personal-hygiene device and be advised to (sequentially) treat some or all portions of the treatment area so that a position map can be generated that covers the relevant positions that may be reached in a treatment session. The portions of the treatment area may coincide with the position zones into which the overall treatment area may be divided. In some embodiments, portions of the treatment area are combined into position zones. In a calibration mode for a toothbrush, the user may be asked to sequentially treat different portions of the dentition. The position information determined during the period the user shall treat a certain portion of the treatment area may then be used as reference to determine the position zone in subsequent treatment sessions. In a subsequent treatment session, position information falling within the range of position information determined during the calibration mode will then relate to a respective position zone. The position map may hence be used to divide the treatment area into position zones. E.g. in an embodiment, where the treatment area comprises the teeth, the calibration mode may be arranged so that the user is asked to sequentially treat all teeth present in the oral cavity. The resulting position map may then be grouped into position zones. In a relatively simple embodiment, the position map is then divided into two position zones, e.g. one position zone for the upper teeth and one position zone for the lower teeth or one position zone for the left teeth and one position zone for the right teeth. In other embodiments, the position map is divided into four position zones (i.e. reflecting the four quadrants of the dentition), or five zones (including a position zone for the front teeth in addition to the four quadrants). Of course, any other number of position zones may be used, e.g. six, seven, eight, nine, ten, eleven, twelve etc. position zones. Teeth may be grouped by two into 16 zones. The groups of teeth may be further divided into position zones for the buccal, lingual, occlusal and/or incisal teeth surfaces of the respective groups. If this is done for each of the maximally 32 teeth, 84 position zones may be used. Other position zones may be applied for other personal-hygiene devices. E.g. for a wet razor, the position zones may include left and right cheek area, chin area, neck area, and upper lip area. For an oral-care device, the calibration mode may allow a user to input that a certain tooth is missing so that the position zone determination can be customized Generally, the processor unit may be arranged to allow user input to customize details of the calibration mode and/or the definition of the position zones. The processor unit may in particular be arranged to have one additional position zone, e.g. a "zeroth" position zone that may be used for position information that can for whatever reason not be assigned to a position zone.

In embodiments, in which the contact pressure of the treatment head is the treatment parameter, the processor unit may accumulate the time periods for each position zone during which the personal-hygiene device is used in the respective position zone. Alternatively or in addition, the time periods during which the contact pressure is above a first threshold value may be accumulated for each position zone. In other embodiments, the processor unit collects regularly read-out pairs of the current treatment parameter value and the current position information (in a refined embodiment, triplets of data points are collected where in addition the time since start of the treatment session is added to the other two data entries). The processor unit may in particular be arranged for accumulating treatment data collected in at least one previous treatment session together with the treatment data generated in the current treatment session. The more treatment data is accumulated, the better may the treatment data be analyzable. This shall not exclude that the whole sequence of data duplets, triples, quadruplets etc. determined at each time instance are stored and are kept for potential later analysis.

The personal-hygiene device comprises a memory unit for storing the position resolved treatment data as was already described. Position resolved treatment data may mean a sequence of e.g. duplets of position information (e.g. determined position zone) and treatment parameter value or may mean accumulated (or time averaged) treatment parameter values per position zone.

Finally, the personal-hygiene system comprises a control unit that triggers an action of the personal-hygiene system based on current position information and on the stored position resolved treatment data. Again giving an example where the treatment parameter is the contact pressure, the control unit may e.g. indicate a warning to the user that the user shall respect a recommended contact pressure value, if the current position information relates to a treatment zone in which a contact pressure above a first threshold value was previously (and potentially repeatedly) detected or where the accumulated time of a too high contact pressure is above a first threshold value (e.g. the threshold value may be an accumulated time value or may be a relative value, e.g. a too high contact pressure was detected during at least 5% of the accumulated time in the current position zone). The control unit may initiate this warning only after at least a treatment session of sufficient length was processed—a sufficient length may mean a period that is shorter than a typical treatment session (e.g. may mean one minute if a typical treatment session lasts two minutes) or may mean one or a plurality of treatment sessions. Generally, the action of the personal-hygiene system may comprise actions that are visible, audibly, or tangibly recognizable by a user. A visibly recognizable action may be switching on of a visible indicator such as an LED or may be displaying of information or an instruction unit, e.g. on an LCD or OLED display. An audibly recognizable action may be switching on of a sound source (e.g. a beeper) or playing of a recorded instruction. A tangibly recognizable action may be a change in one of an amplitude or a frequency of a vibrator (e.g. a vibrator is shortly switched on) or of a drive unit (e.g. used for driving the treatment head).

The control unit may be arranged to compare the current treatment parameter value with a first (in particular predetermined) threshold value and to base the action of the personal-hygiene device on the comparison outcome. The control unit may alternatively or additionally be arranged to compare a value from the stored position resolved treatment data for the current position with a first (in particular predetermined) threshold value and to base the action of the personal-hygiene device on the comparison outcome. E.g. the stored value of the position resolved treatment data may be the averaged contact pressure and then the control unit would only display a treatment advice (i.e. instruction) if the averaged contact pressure for the current position is above the first threshold value. The control unit may also compare with two threshold values and may base the action on whether the current value is only above the first threshold but not above the second threshold or whether the current value is also above the second threshold value. Thus, the control unit can provide an escalated action system. E.g. only an instruction is displayed if the current treatment parameter value lies between first and second threshold values, but also a tangibly perceivable indication is triggered by the control unit if the current value is above the second threshold value. In some embodiments, the control unit may escalate the action based on the number of actions that were provided already during the treatment session for a given position zone.

One or several parts of the personal-hygiene system may be located in a device that is physically separate from the personal-hygiene device. E.g. the processor unit may be disposed in a device that is physically separate from the personal-hygiene device. The processor unit may be disposed in a smart phone or in a computer, e.g. a cloud computer. The personal-hygiene system may thus comprise communication means between the personal-hygiene device and the separate device, e.g. a standardized or proprietary wireless connection. The wireless connection may be a WLAN connection or may be established via the Internet.

The personal-hygiene system may comprise a display arranged for displaying information or instructions before, during, or after a treatment session. Information may comprise treatment data or analyzed treatment data. Information or instructions may in particular be displayed as a triggered action of the personal-hygiene system. The display may be located at the personal-hygiene device or may be physically separate from the personal-hygiene device (e.g. in case a smart phone is used as physically separate device, the display of the smart phone may realize the display of the personal-hygiene device). Different from each other separate devices may be used that each comprise one or more of the described components of the personal-hygiene system. E.g. a display may be disposed in a first separate device and the processor unit may be disposed in another separate device. The personal-hygiene device and any other separate device may comprise at least one of a transmitter and receiver for establishing a wired or wireless communication. A device having a transmitter and a receiver may instead comprise a transceiver.

The personal-hygiene system may comprise a user interface (arranged at the personal-hygiene device or at a physically separate device) for inputting at least one instruction command for influencing the workflow of the control unit. This includes the possibility to customize the actions of the personal-hygiene system.

The personal-hygiene device may comprise a user-identification unit. This may be arranged by a user interface allowing to input the current user (e.g. by means of typing the user's name or choosing the user's name from a previously generated list or by a fingerprint sensor etc.). Alternatively or additionally this may be arranged by a camera for taking a picture of the user and a picture analysis program. The camera may also be arranged to identify a certain gesture of the user (e.g. showing a certain number of fingers may determine the current user, such as showing four fingers means that the fourth user from a list of possible users is currently using the personal-hygiene system).

As was stated before, the personal-hygiene system comprises a control unit that triggers an action of the personal-hygiene system based on a current position information and on at least the stored position resolved treatment data. The action that is triggered may be one or several of displaying treatment data and/or information and/or treatment advise (where information may include analyzed position resolved treatment data such as a map of accumulated changing a frequency or amplitude of a driven treatment head at least for a predetermined time period, controlling an indicator unit to deliver a visually, audibly, or tangibly perceivable signal, where the indicator unit may be a light source (e.g. an LED), a sound source (e.g. a loudspeaker), or a vibration source (e.g. a vibrator such as a piezoelectric vibrator).

The action is in particular triggered in case that the position resolved treatment data is above a threshold value for the current position zone. Instead of one threshold value, a first and at least a second threshold value can be used and the action that is triggered is escalated when the position resolved treatment parameter has a value above the second threshold value—e.g. the action that is triggered may ten comprise a visually and an audibly perceivable feedback to the user instead of, e.g., only a visually perceivable feedback.

The herein proposed personal-hygiene system enables to provide feedback to the user about behavior that was recorded in the past and that may now reoccur with a certain high probability that the respective behavior is encouraged or discouraged, depending on whether the behavior was "good" or "bad" behavior. Bad behavior (e.g. using too high pressure in certain position zones) may thus be reduced and good behavior may be stimulated, so that the overall behavior may be improved.

FIG. 1 is an example depiction of a personal-hygiene system 1 in accordance with the present disclosure. The personal-hygiene system 1 comprises a personal-hygiene device 100, here realized as an electric toothbrush, and a separate display and processor unit 200. The personal-hygiene device 100 comprises a treatment head 110 for applying a treatment to a user's treatment area, e.g. brushing of teeth in the oral cavity and a handle 120. As is shown, a user 300 can grab the handle 120 with a hand 310 in order to position the treatment head 110 at the treatment area 320 (here: the oral cavity). The separate display and processor unit 200 comprises a position-determinatin unit 210 having a camera 220 and a display 230. The personal-hygiene device 100 and the separate display and processor unit 200 may be arranged for wireless communication (e.g. the both may comprise respective transceiver units and the wireless communication may be in accordance with a standard such as Bluetooth (industry standard IEEE 802.15.1) or may follow a proprietary protocol. The personal-hygiene system shown in FIG. 1 is only one example. In other embodiments, all relevant features of the personal-hygiene system are housed in the personal-hygiene device itself (e.g. a camera may be disposed in or close to the treatment head in order to perform a position determination based on a video or picture stream from the camera).

Figure 2:
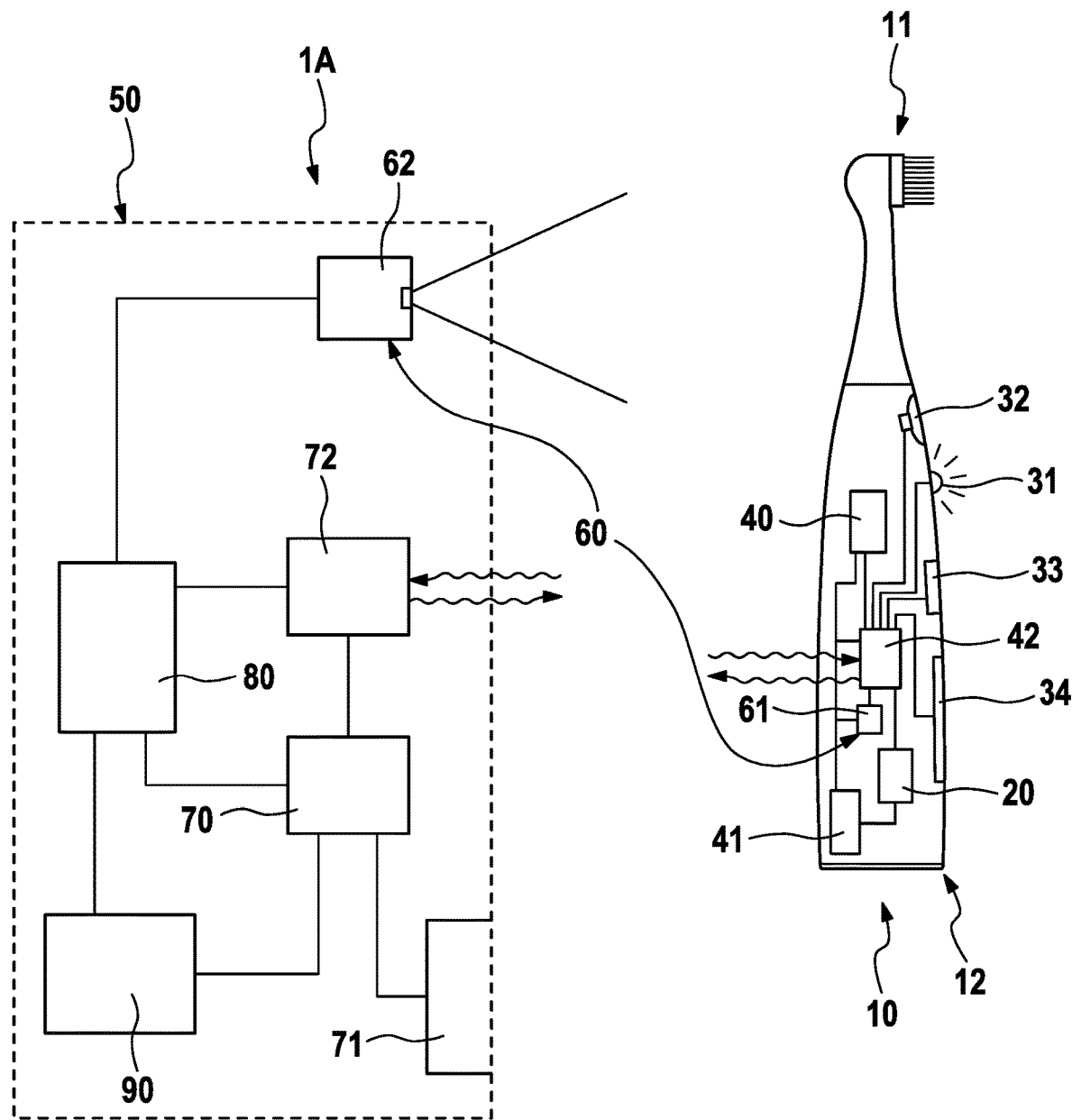
FIG. 2 is a schematic depiction of the functional components of a personal-hygiene system as disclosed herein.

FIG. 2 is a schematic depiction of the relevant functional features of a personal-hygiene system 1A. The personal-hygiene system 1A comprises a personal-hygiene device 10 having a treatment head 11 and a processing arrangement 50, indicated by a dashed rectangle. The various components of the processing arrangement 50 may be disposed in the personal-hygiene device 10 or in at least one separate device as shown in FIG. 1. In some embodiments, various parts of the processing arrangement 50 are physically disposed in at least two different devices, where one may be the personal-hygiene device.

In the shown example embodiment, the personal-hygiene device 10 comprises a treatment head 11 and a handle 12. It is schematically indicated that various components may be housed in the handle 12, such as a drive unit 40 and an energy source 41 and further a transceiver 42 for receiving signals and for transmitting signals in a wireless manner. The personal-hygiene device 10 here comprises various indicator elements such as a light source 31 (e.g. an LED), a sound source 32 (e.g. a loudspeaker), a vibration source 33 (e.g. a piezo-electric vibrator) and a display 34. The personal-hygiene device also comprises a sensor unit 20 for determining values of at least one treatment parameter during operation. The sensor unit 20 may comprise one or several of the sensors that had been mentioned before.

Further, the personal-hygiene device system 1A comprises a position-determinatin unit 60 (which position-determinatin unit 60 has in the shown example embodiment a first component 61 that is disposed in the personal-hygiene device 10 (e.g. an accelerometer) and a second component 62 that is disposed in a device physically separate from the personal-hygiene device (e.g. a camera). The position-determinatin unit 60 is arranged to determine position information of the treatment head 11 in temporal succession during a treatment session (i.e. position information is determined at a plurality of time instances during the treatment session), in particular position information of the treatment head 11 in relation to a user's treatment area.

The processing arrangement 50 comprises a control unit 70, a user interface unit 71, and a transceiver 72 for receiving and transmitting data in a wireless manner. Further, the processing arrangement 50 comprises a processor unit 80 and a memory unit 90. The position-determinatin unit 60 here is coupled with the processor unit 80 and also with the transceivers 42 and 72, so that the position information is determined by using a dedicated portion of the processor unit 80.

The sensor unit 20 is arranged for determining treatment parameter values of at least one treatment parameter in temporal succession during a treatment session. The time instances at which the treatment parameter values are determined do not need to coincide with the time instance at which the position information is determined. Duplets of relating position information and treatment parameter values may be determined by finding those that temporally are lying closest to each other or by interpolating between values. The processor unit 80 is arranged to process the determined position information and the respective relating treatment parameter value to generate at least position-resolved treatment data. For this process, the position information may be sorted into position zones to provide a (in particular predetermined) limited number of position possibilities. The memory unit 90 is coupled with the processor unit 80 and is arranged to store at least the position-resolved treatment data. In some embodiments, the memory unit 90 is used to store the full lists of all acquired position information and treatment parameter values, optionally each together with a time value indicating the determination time. Optionally, further information may be stored such as the user that had performed the treatment session and/or the type of treatment head that was used etc. The control unit 70 is arranged to trigger an action of the personal-hygiene system 1A based at least on current position information and on the stored position-resolved treatment data. Such actions may in particular be chosen to improve a treatment behavior of the user in view of the stored position-resolved treatment data from which a past improvable treatment behavior can be derived.

FIG. 3A is a depiction of example position information P acquired during a single treatment session (the position information is here already depicted as position zone information, where in this example five position zones were used), where the treatment session started at time instant t0 and ended at time instant $t_e$. While the position information is shown here as a continuous line, it is understood that this is a depiction of position information acquired at a plurality of successive time instances during the treatment session. It shall also be understood that the user may make short breaks during the treatment session, which are not shown. FIG. 3B is a depiction of example treatment parameter values T acquired during the same treatment session. FIG. 3C is a depiction of position resolved treatment data $\bar{T}_0$ accumulated over the treatment session (the status as shown in FIG. 3C represents the accumulation over the whole treatment session), where the treatment time per position was accumulated. FIG. 3D is a depiction of similar position resolved treatment data $\bar{T}_1$ as shown in FIG. 3C, but in FIG. 3D the time was accumulated during which the treatment parameter V depicted in FIG. 3B was above a first threshold value $V_1$.

FIG. 3A shows the position zone in which the head of the personal-hygiene device was used during the treatment session. The treatment period $\Delta T=(t_e-t_0)$ may have lasted 2 minutes. At time instant t the position zone P(t) is here position 3 (where five position zones 1 to 5 are used in this example). It is contemplated that the personal-hygiene device was an electric toothbrush and the position-determinatin unit used a camera to provide a video stream from the users face, including the hand holding the electric toothbrush. The position zone can then directly be determined by a trained algorithm that determines the position zone based on features in the video pictures that may be identified in a machine learning process. Other techniques are of course possible as well such as motion capturing technology. Instead of position information in the form of position zones, the position information may, e.g., be a 3-dimensional position vector that indicates where the treatment head is located at a given time instant in relation to a fixed point (the fixed point may in particular be fixed with respect to the treatment zone).

FIG. 3B shows the treatment parameter value V measured by the sensor unit during the same treatment session as in FIG. 3A. At time instant t the measured treatment parameter value is V(t). The treatment parameter determined in this example may have been the pressure with which the treatment head was pushed against the teeth. The curve V(t) is just shown for explanatory reasons and shall not necessarily represent a real curve V(t). It is known that the treatment pressure applied with a toothbrush head should optimally be within a recommended pressure range. Too low pressure does not lead to effective cleaning and too high pressure may affect the gum health. As one option, the processor unit may apply a first threshold value $V_0$ for the treatment parameter under which the treatment time would not be counted (respective time periods would not be accumulated—the user may receive an indication that the applied pressure is too low). In the example shown in FIG. 3B, all treatment parameter values V(t) were always above this threshold value $V_0$. A second threshold value $V_1$ is shown in FIG. 3B, which second threshold value $V_1$ may have been set to indicate that the applied treatment pressure is too high. A third threshold value $V_2$ may have been used in addition to indicate that the high treatment pressure is so extremely high that an immediate response is to be affected, e.g. the drive of the electric toothbrush may be reduced during the time the treatment parameter above the third threshold value $V_2$.

FIG. 3C is the depiction of the accumulated treatment time $\bar{T}_0$ per position zone (as one possibility of position resolved treatment data). FIG. 3C shows the status at the end of the treatment period. It can be imagined that the columns of accumulated treatment time grow from zero at the start of the treatment period to their length as shown. In some embodiments, the personal-hygiene system may be arranged to display the current status of the accumulated position resolved treatment data during the treatment session. A threshold value $\bar{T}_a$ is here used to indicate the ideal expected treatment time per treatment zone (assuming that the same accumulated treatment time is here sensible for all position zones). As can be seen, the accumulated treatment time in position zones 1 to 3 was above the threshold value, while the accumulated treatment time in position zones 4 and 5 was too low. E.g. position zones 4 and 5 may relate to the right upper and lower molars, which are typically brushed with less treatment time than the front teeth or the left upper and lower molars. The personal-hygiene system is arranged to store this position resolved treatment data in its memory unit. In a successive treatment session, this stored position resolved treatment data may be used as follows: once the current position zone become either position zone 4 or 5, the control unit may trigger as an action of the personal-hygiene system the displaying of a brushing advice to the user, informing the user that she or he is brushing a position zone that the user has historically neglected. As a consequence, the user will spend more time in the current brushing zone and will thus improve his treatment behavior. It is understood that the columns s shown in FIG. 3C may be modified by the treatment parameter values and position information of the current treatment session. The processor unit may be arranged to discard data having a certain age, e.g. the columns may only show information from the past ten treatment sessions (where the number ten is just an arbitrary number and only the last treatment session may be used or the last two, three, four etc. or the last eleven, 12, 13, 20, 30, 50, 100 etc. treatment session may be used). The processor unit may be arranged to keep the respective information from past treatment session so that a comparison with the current treatment behavior is enabled and the improvement in the behavior can be tracked. With respect to FIG. 3C, the actions triggered by the personal-hygiene system may slightly discourage the long treatment time used for position zones 1 and 3 and may positively encourage the increase of treatment time in position zones 4 and 5. E.g. the columns may indicated that the overall treatment time in position zones 4 and 5 is too short by 10 seconds per treatment session. Hence, when the user currently brushes in positions zones 4 or 5, an advice to brush longer in the current zone may be displayed as triggered action, but only for a certain time period that will not be in conflict with the increase that is to be achieved.

The position resolved treatment data may be normalized so that the data reflects the percentage of time the user spends in a position zone per unit time. Then the respective accumulated results from different treatment sessions can be combined (and again be normalized) to present an average for an in particular predetermined number of treatment session. E.g. the processor unit may be arranged to combine always the position resolved treatment data from the last ten treatment sessions, as already mentioned. This allows the user to identify a sustainable improvement in his treatment behavior if the accumulated position-resolved treatment data better approximates an ideal treatment.

FIG. 3D is a depiction of the accumulated treatment time $T_1$ during which the applied pressure value (FIG. 3B) is above the first threshold value $V_1$ per position zone. This is an additional or alternative example of position resolved treatment data, which is accumulated over time for a treatment session. The treatment time above a threshold pressure may also be normalized to the treatment time per position zone so that the accumulated data is an indication of the percentage of the treatment time above the pressure threshold. In a next treatment session, the control unit may trigger as action an advice to reduce the applied pressure at least for position zones 1 to 4 as the treatment time above the pressure threshold is relatively high. The advice may be presented in at least one of various manners to the user, e.g. the advice may be communicated by lighting or flashing a light source (e.g. an LED) or the advice may be provided as readable text on a display (e.g. an LCD or OLED display) or the advice may be presented as an acoustic signal or a voice message or the advice may be provided as a tangible signal (e.g. a vibration). In case that a significant percentage of treatment time above the pressure threshold were present only for one position zone, the control unit might trigger such an advice only if the current position information related to the respective position zone. The control unit may also be arranged to escalate the actions that are triggered. E.g. if the treatment time above the pressure threshold has not improved for a particular position zone over the previous treatment session, than the control unit may e.g. add an acoustic warning in addition to displaying the mentioned advice or it may reduce the motor speed or amplitude.

In addition or alternatively to the position-resolved treatment data shown in FIGS. 3C and 3D, other position-resolved treatment data may be generated, e.g. the average applied pressure per position zone may be determined or the maximum and the minimum applied pressure per position zone may be determined. Of course, in dependence on the used sensor, many other treatment parameters in addition or alternatively to treatment time or applied pressure may be determined and stored as position-resolved treatment data.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:
1. An oral-care system, comprising:
an oral-care device having a treatment head;
a position-determination unit for determining position information of the treatment head in relation to a user's treatment area at a plurality of time instances during a treatment session;
a sensor unit for determining treatment parameter values of at least one treatment parameter at the plurality of time instances;
a processor unit for processing the determined position information and the determined treatment parameter values to generate at least position-resolved treatment data;
a memory unit for storing at least the position-resolved treatment data; and
a control unit for triggering an action of the oral-care system based at least on a current position information and on the stored position-resolved treatment data from at least one previous treatment session.

2. The system of claim 1, wherein the processor unit is arranged to resolve the position information into a predetermined number of position zones and to accumulate the treatment parameter per position zone, wherein an accumulation of the treatment parameter per position zone comprises adding or averaging the treatment parameter value in a time-weighted manner, such that for each position zone a position-zone counter is increased if the determined position information relates to the position zone.

3. The system of claim 1, wherein the control unit is arranged to trigger the action of the system only after a predetermined period of time of the current treatment session has passed or after a predetermined number of treatment sessions have been performed.

4. The system of claim 1, wherein the system comprises a user-interface unit for inputting at least one instruction command for influencing a workflow of the control unit.

5. The system of claim 4, wherein the system comprises a user-identification unit.

6. The system of claim 1, wherein the system comprises a treatment-data-analysis unit for processing position-resolved treatment data from at least one treatment session.

7. The system of claim 1, wherein the position-determination unit comprises at least one of a video camera, a magnetic sensor, a capacitive sensor, an IR sensor, a temperature sensor, an acceleration sensor, a gyroscope, an inclination sensor, an ultrasound emitter, and an ultrasound receiver, or any combination thereof.

8. The system of claim 1, wherein the system has a calibration mode in which the position-determination unit assembles position information for determining a position map.

9. The system of claim 8, wherein the position-determination unit is arranged to segment the position map into a number of position zones, wherein the number of position zones is selected from the group consisting of at least two position zones, at least five position zones, and at least sixteen position zones.

10. The system of claim 1, wherein at least a portion of the processor unit is disposed in a device physically separate from the oral-care device.

11. The system of claim 10, wherein the oral-care device is selected from the group consisting of a smart phone and a cloud computer.

12. The system of claim 1, wherein the sensor unit is selected from the group consisting of at least one of a pressure sensor, a movement sensor, an inclination sensor, a plaque sensor, a torque sensor, a halitosis sensor, a chemical sensor, a pH sensor, a motor-current sensor, and a motor-voltage sensor.

13. The system of claim 1, wherein the system comprises a display and wherein the control unit is arranged to show at least one of the position-resolved treatment data, an analysis of the treatment data, and a treatment advice, as the action of the system.

14. The system of claim 1, wherein the system comprises a drive unit for driving the treatment head into a motion having at least one of a frequency or an amplitude, and the control unit is arranged to trigger at least one of the frequency and the amplitude at which the treatment head is driven as the action of the system.

15. The system of claim 1, wherein the system comprises an indicator unit for indicating information in at least of a visual, audible, and tangible perceivable manner and wherein the control unit is arranged to trigger an indication by the indicator unit as the action of the system.

16. The system of claim 1, wherein the control unit is arranged to conduct a comparison of a value from the position-resolved treatment data with at least a first threshold value, and to trigger the action based on an outcome of the comparison.

* * * * *